US000001799H

United States Statutory Invention Registration [19]

[11] Reg. Number: H1,799

Rhodes et al.

[45] Published: Aug. 3, 1999

[54] STAR POLYMER VISCOSITY INDEX IMPROVER FOR OIL COMPOSITIONS

[75] Inventors: Robert Barnett Rhodes, Houston; Harvey E. Atwood, Kingwood; John Eugene Gorman, Houston, all of Tex.

[73] Assignee: Shell Oil Company, Houston, Tex.

[21] Appl. No.: 08/164,733

[22] Filed: Dec. 7, 1993

Related U.S. Application Data

[62] Division of application No. 08/083,857, Jun. 25, 1993, abandoned, which is a continuation of application No. 07/790,610, Nov. 8, 1991, abandoned.

[51] Int. Cl.[6] ..... C09K 7/00

[52] U.S. Cl. ..... 525/314

[56] References Cited

U.S. PATENT DOCUMENTS

| | | | |
|---|---|---|---|
| Re. 27,145 | 6/1971 | Jones | 260/880 |
| 3,985,830 | 10/1976 | Fetters et al. | 260/880 B |
| 4,116,917 | 9/1978 | Eckert | 260/33.6 |
| 4,156,673 | 5/1979 | Eckert | 260/33.6 |
| 4,780,367 | 10/1988 | Lau et al. | 525/314 |
| 4,849,481 | 7/1989 | Rhodes et al. | 525/314 |
| 5,070,131 | 12/1991 | Rhodes et al. | 524/484 |

FOREIGN PATENT DOCUMENTS 716645 8/1965 Canada .

*Primary Examiner*—Charles T. Jordan
*Assistant Examiner*—Meena Chelliah

[57] ABSTRACT

The present invention includes star polymers which can be used as viscosity index improvers in oil compositions formulated for high performance engines. The star polymers have copolymer arms of hydrogenated polyisoprene and polystyrene with sufficient amounts of polystyrene to be finishable as a polymer crumb.

6 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

STAR POLYMER VISCOSITY INDEX IMPROVER FOR OIL COMPOSITIONS

This is a division of application Ser. No. 08/083,857, filed Jun. 25, 1993, now abandoned which is a continuation of application Ser. No. 07/790,610, filed Nov. 8, 1991, now abandoned.

BACKGROUND OF THE INVENTION

This invention relates to star polymers of hydrogenated isoprene and styrene, and to oil compositions containing the star polymers.

The viscosity of lubricating oils varies with temperature. In general, oils are identified by a viscosity index which is a function of the oil viscosity at a given lower temperature and a given higher temperature. The given lower temperature and the given higher temperature have varied over the years but are fixed at any given time in an ASTM test procedure (ASTM D2270). Currently, the lower temperature specified in the test is 40° C. and the higher temperature specified in the test is 100° C.

Numerous methods have been proposed for improving the rheological properties of lubricating oil compositions. Generally, these methods involve the use of a polymeric additive which cannot be handled as a solid. More recently, it has been discovered that certain asymmetric star-shaped polymers are both solid polymers and effective VI improvers for lubricating oil compositions as disclosed in U.S. Pat. No. 4,849,481. The patent describes asymmetric star polymers of conjugated diolefin blocks, such as polyisoprene, and monoalkenyl aromatic blocks, such as polystyrene. The star polymers contain a substanial amount of the monoalkenyl aromatic blocks and produce oil compositions having reduced high temperature, high shear rate (HTHSR) viscosities. The asymmetric star polymers have sufficient amounts of the monoalkenyl aromatic blocks to be cyclone finishable as a polymer crumb.

Although reduced HTHSR viscosities likely indicate good fuel efficiency, increased HTHSR viscosities are needed for high performance engines which operate at higher temperatures and rpms, or for engines having marginally designed journal bearings. Minimum HTHSR viscosities have been proposed as an industry standard. Star polymers having a sufficiently low amount of the monoalkenyl aromatic blocks to have a high HTHSR viscosity were expected to not have a sufficient amount of the monoalkenyl aromatic blocks to be cyclone finishable as a polymer crumb or were expected to cause gelation.

Process oils which detract from VI improver properties often must be added to non-cyclone finishing polymers in order to finish the polymers by falling strand methods. For this reason, star polymers having low amounts of the monoalkenyl aromatic blocks were not specifically described or claimed in U.S. Pat. No. 4,849,481. FIG. 1 of the patent does suggest that oil compositions such as multigrade SAE 10W-40 (graded according to the SAE J300 standard of the SAE Engine Oil Viscosity Classification System) can be produced with the asymmetric star polymers having a low monoalkenyl aromatic block content. However, the patent does not suggest that the star polymers having low amounts of the monoalkenyl aromatic blocks would be both cyclone finishable and useful in preparing oil compositions having higher HTHSR viscosities.

SUMMARY OF THE INVENTION

The present invention includes star polymers which can be used as viscosity index improvers in oil compositions formulated for high performance engines. The star polymers have specific block copolymer arms of hydrogenated polyisoprene and polystyrene. The star polymers contain a sufficient amount of hydrogenated polyisoprene for good viscosity index improving properties and a sufficient amount of polystyrene to be cyclone finishable as a polymer crumb.

DETAILED DESCRIPTION OF THE INVENTION

The star polymer viscosity index (VI) improvers of the present invention are produced by coupling living block copolymer molecules having specific structures. The living molecules consist essentially of a polystyrene block connected to a living block of polyisoprene, wherein the polyisoprene block has a number average molecular weight ($MW_I$) between 30,000 and 70,000 and the styrene block has a number average molecular weight ($MW_S$) from 4,000–$MW_I$/30 to 3,000+$MW_I$/30. The living polymer molecules are coupled with a polyalkenyl coupling agent such as divinylbenzene wherein the ratio of moles of divinylbenzene to living polymer molecules is at least 2.5:1. The star polymer is then selectively hydrogenated to saturate at least 95% by weight of the isoprene units and less than 15% by weight of the styrene units.

The star polymers of the present invention are readily produced by the processes described in Canadian Patent No. 716,645 and U.S. Pat. No. Re 27,145 which process descriptions are incorporated by reference herein. However, the star polymers of the present invention have molecular weights not taught by the references.

When the number average molecular weight of each polyisoprene block is at least about 75,000, the star polymers are cyclone finishable as a solid crumb in the absence of blocks of polystyrene. However, the longer hydrogenated polyisoprene blocks are prone to shearing when used as a VI improver. On the other hand, star polymers having polyisoprene blocks with number average molecular weights less than 30,000 may require excessively large polystyrene blocks to be cyclone finishable and do not provide a suitable low temperature oil viscosity. All number average molecular weights recited herein are determined from a conventional gel permeation chromatography (GPC) curve unless stated otherwise.

It was previously expected that the minimum size of polystyrene blocks that would allow cyclone finishing would substantially lower the high temperature, high shear rate (HTHSR) viscosity of oil compositions containing the star polymers. The present invention includes the suprising discovery that cylcone finishable star polymers having high HTHSR viscosities and good low temperature performance can be prepared by limiting the size of the polystyrene blocks.

The star polymers of this invention which are useful as VI improvers are prepared by anionically polymerizing polystyrene in the presence of sec-butyllithium, adding isoprene to the living polystyrene molecules to making living block copolymer molecules, coupling the living block copolymer molecules with a polyalkenyl coupling agent to form a star polymer, and selectively hydrogenating the polyisoprene blocks. The star polymers of the present invention may be characterized prior to hydrogenation as having a dense center or nucleus of crosslinked poly(polyalkenyl coupling agent) and a number of block copolymer arms extending outwardly therefrom. The number of arms, as determined by conventional gel permeation chromatography (GPC), may vary considerably but typically range from about 6 to about 13. The actual number of arms is unknown since GPC-Low Angle Laser Light Scattering indicates a substantially greater number of arms than conventional GPC techniques.

The star-shaped polymers of this invention may be represented by the general formula $(A-B)_n-X$ wherein A-B is a block copolymer comprising a single block A of polystyrene and a single block B of hydrogenated polyisoprene, n is the number of block copolymer arms in the star polymer, and X is the poly(polyalkenyl coupling agent) nucleus.

In general, the star polymers may be hydrogenated using any of the techniques known in the prior art to be suitable for selective hydrogenation of olefinic unsaturation over aromatic unsaturation. The hydrogenation conditions must be sufficient to hydrogenate at least 95% of the original olefinic unsaturation. Hydrogenation of aromatic unsaturation must be less than 15% to avoid reduction of the amount of polystyrene needed to finish the star polymers.

In general, hydrogenation involves the use of a suitable catalyst as described in U.S. Pat. No. Re 27,145 which is herein incorporated by reference. A mixture of nickel ethylhexanoate and triethylaluminum having from 2 to 3 moles of aluminum per mole of nickel is preferred.

The hydrogenated star polymers of this invention may be added to a variety of lubricating oils to improve viscosity index characteristics. For example, the selectively hydrogenated star polymers may be added to fuel oils such as middle distillate fuels, synthetic and natural lubricating oils, crude oils and industrial oils. In general, any amount of the selectively hydrogenated star polymers may be blended into the oils, with amounts from about 0.05 to about 10 wt % being most common. Amounts within the range from about 0.5 to about 2.5 wt % are preferred.

Lubricating oil compositions prepared with the selectively hydrogenated star polymers of this invention may also contain other additives such as anti-corrosive additives, antioxidants, detergents, pour point depressants, one or more additional VI improvers and the like. Typical additives which are useful in the lubricating oil composition of this invention and their description will be found in U.S. Pat. Nos. 3,772,196 and 3,835,083, the disclosure of which patents are herein incorporated by reference.

PREFERRED EMBODIMENT OF THE INVENTION

In a preferred embodiment of the present invention, a star polymer is produced by anionically polymerizing styrene and then isoprene to produce living polystyrene-polyisoprene-Li molecules. The polyisoprene blocks preferably have a number average molecular weight between 30,000 and 60,000 and the polystyrene blocks preferably have a number average molecular weight from 3,000 to 4,000. The living block copolymer molecules are coupled with divinylbenzene using 3 moles of divinylbenzene per mole of copolymer molecules. The coupled polymers are selectively hydrogenated with a solution of nickel ethylhexanoate and triethylaluminum having a Al/Ni ratio of about 2.5:1 to saturate at least 98% of the isoprene units and less than 10% of the styrene units.

Such star polymers are cyclone finishable as a polymer crumb and produce oil compositions having a good balance of high and low temperature viscosities suitable for high performance engines.

Having thus broadly described the present invention and the preferred embodiment, it is believed that the invention is further described by reference to the following examples. It will be appreciated, however, that the examples are presented solely for purposes of describing the invention and should not be construed as the limits of the invention.

EXAMPLE 1

In this example, a star polymer consisting essentially of arms of a block copolymer containing a single block of polystyrene and a single block of hydrogenated polyisoprene was prepared. In the first step of the preparation, living molecules of polystyrene were prepared by anionically polymerizing styrene in cyclohexene. The polymerization of styrene was initiated by adding sec-butyllithium. The polymerization of the styrene was completed to produce living polystyrene molecules having a number average molecular weight of 3,100. Polyisoprene blocks were then formed by adding isoprene to the solution of living polystyrene molecules. The polymerization of isoprene was completed to produce polyisoprene blocks having a number average molecular weight of 53,400.

The living block copolymer arms were then coupled with divinylbenzene using 3 moles of divinylbenzene per mole of the living block copolymer molecules. The coupling reaction was allowed to proceed to completion after which the lithium sites remaining in the star polymer were deactivated by adding an alcohol.

The star polymer was next hydrogenated so as to saturate greater than 98% of the olefinic unsaturation originally contained in the isoprene blocks and less than 15% of the aromatic unsaturation using a catalyst prepared by combining nickel ethylhexanoate and triethylaluminum (2.3 moles of aluminum per mole of nickel). The melt viscosity of the star polymer was sufficiently high to permit finishing as a solid polymer crumb. The melt viscosity of the star polymer was 38.2 megapoise at 250° F. The data and results are summarized in Table 1.

EXAMPLE 2

In this example, a star polymer consisting essentially of arms of a styrene/isoprene block copolymer was prepared using the procedure summarized in Example 1 except that the number average molecular weight of the polystyrene blocks was 3,720 and the number average molecular weight of the polyisoprene blocks was 46,300. The melt viscosity of the star polymer was 36.2 megapoise at 250° F. The data and results are summarized in Table 1.

EXAMPLE 3 (COMPARISON)

In this example, a star polymer consisting essentially of arms of a styrene/isoprene block copolymer was prepared using the procedure summarized in Example 1 except that the number average molecular weight of the polystyrene blocks was 4,610 and the number average molecular weight of the polyisoprene blocks was 51,200. The melt viscosity of the star polymer was 48.5 megapoise at 250° F. The data and results are summarized in Table 1.

EXAMPLE 4 (COMPARISON)

In this example, a star polymer consisting essentially of arms of a styrene/isoprene block copolymer was prepared using the procedure summarized in Example 1 except that the number average molecular weight of the polystyrene blocks was 2,200 and the number average molecular weight of the polyisoprene blocks was 41,500. The melt viscosity of the star polymer was 5.0 megapoise at 250° F. The data and results are summarized in Table 1.

EXAMPLE 5 (COMPARISON)

In this example, a star polymer consisting essentially of arms of a styrene/isoprene block copolymer was prepared using the procedure summarized in Example 1 except that the number average molecular weight of the polystyrene blocks was 2,200 and the number average molecular weight of the polyisoprene blocks was 48,100. The melt viscosity of the star polymer was 12.3 megapoise at 250° F. The data and results are summarized in Table 1.

EXAMPLE 6 (COMPARISON)

In this example, a star polymer consisting essentially of arms of a styrene/isoprene block copolymer was prepared using the procedure summarized in Example 1 except that the number average molecular weight of the polystyrene blocks was 5,750 and the number average molecular weight of the polyisoprene blocks was 54,000. The melt viscosity of the star polymer was 69.4 megapoise at 250° F. The data and results are summarized in Table 1.

EXAMPLE 7 (COMPARISON)

In this example, a hydrogenated asymmetric star polymer comprising arms of a block copolymer containing a single block of polystyrene and a single block of hydrogenated polyisoprene and arms of hydrogenated polyisoprene was prepared. In the first step of the preparation, living molecules of polystyrene were prepared by anionically polymerizing styrene in cyclohexene. The polymerization of the styrene was initiated by adding sec-butyllithium. The polymerization of the styrene was completed to produce living polystyrene molecules having a number average molecular weight of 7,800. Polyisoprene blocks and living polyisoprene molecules were then formed by adding additional sec-butyllithium and isoprene to the solution of living polystyrene molecules. The ratio of the second amount of sec-butyllithium to the first amount of sec-butyllithium was about 11:5. The polymerization of isoprene was then completed to produce polyisoprene blocks and living polyisoprene molecules having a number average molecular weight of 46,400. The indicated ratio of sec-butyllithium prepares a mixture of about 30% living block copolymer molecules and 70% living polyisoprene molecules.

The living polymer molecules were then coupled with divinylbenzene using 3 moles of divinylbenzene per mole of the polymer molecules. The coupling reaction was allowed to proceed to completion after which the lithium sites remaining in the star polymer were deactivated by adding methanol.

The star polymer was next hydrogenated so as to saturate greater than 98% of the olefinic unsaturation originally contained in the polyisoprene and less than 15% of the aromatic unsaturation using the catalyst of Example 1 (2.8:1 Al/Ni). The ratio of block copolymer arms to homopolymer arms is believed to be the same as the ratio of these components in the initial blend of block copolymer molecules and homopolymer molecules used to prepare the star-shaped polymer; i.e. 5 to 11 or about 30% block copolymer arms. The melt viscosity of the asymmetric star polymer was 35.0 megapoise at 250° F. The data and results are summarized in Table 1.

EXAMPLE 8 (COMPARISON)

In this example, hydrogenation of the asymmetric star polymer of Example 7 was allowed to hydrogenate about 23% of the aromatic unsaturation of the star polymer (2.6:1 Al/Ni). The melt viscosity of the star polymer was 23.4 megapoise at 250° F. The data and results are summarized in Table 1.

TABLE 1

| Example | Styrene $MS_S$ | Isoprene $MW_I$ | Finishible as Solid Crumb | Melt Vis 250° F. M Poise |
|---|---|---|---|---|
| 1 | 3,100 | 53,400 | Yes | 38.2 |
| 2 | 3,720 | 46,300 | Yes | 36.2 |
| 3 | 4,610 | 51,200 | Yes | 48.5 |
| 4c | 2,200 | 41,500 | No | 5.0 |
| 5c | 2,200 | 48,100 | No | 12.3 |
| 6c | 5,750 | 54,000 | Yes | 69.4 |
| *7c | 7,800 | 48,400 | Yes | 35.0 |
| *8c | 7,800** | 46,400 | Yes | 23.4 |

*Approximately 30% of the arms contained polystyrene blocks
**Approximately 23% of aromatic unsaturation was hydrogenated

EXAMPLES 9–11

In these examples the star polymers produced in Examples 1–3 were used as VI improvers in a SAE 10W-40 multigrade lubricating oil composition. The base stock used in the preparation of the multigrade lubricating oil composition was a blend of an HVI 10ON oil and an HVI 250N oil. The amount of each VI improver was varied so as to provide a lubricating oil composition having a kinematic viscosity of 14 centistokes (cst) at 100° C. The multigrade lubricating oil compositions prepared in these examples contained 31.0% by weight of HVI 250N (DP), 7.75 wt % of a commercially available additive package (Lubrizol 7573A), and 0.3 wt % Acryloid 160. The viscosity index (VI), the cold cranking simulator (CCS) viscosity at −20° C., the engine oil pumpability (TP1) at −25° C. using the mini-rotary viscometer (ASTM D4684), and the high temperature high shear rate (HTHSR) viscosity at 150° C. at $1\times10^6$seconds$^{-1}$ using the tapered bearing simulator (TBS) (ASTM D4683) were determined for each lubricating oil composition.

All of these examples produced oil compositions from cyclone finished polymer crumb. The oil compositions have good HTHSR viscosities and good low temperature viscosities. The data and results are summarized in Table 2.

EXAMPLES 12–16 (COMPARISON)

In these examples the star polymers produced in Comparative Examples 4–8 were used as VI improvers in a 10W-40 multigrade lubricating oil composition as described for Examples 9–11. The data and results are summarized in Table 2.

TABLE 2

| Example | Polymer Example | Polymer % wt. | CCS | TP1 | VI | TBS |
|---|---|---|---|---|---|---|
| 9 | 1 | 0.95 | 3,210 | 168 | 155 | 3.46 |
| 10 | 2 | 1.03 | 3,360 | 197 | 155 | 3.48 |
| 11 | 3 | 0.97 | 3,340 | 203 | 154 | 3.49 |
| 12c | 4c | 1.19 | 3,140 | 189 | 156 | 3.68 |
| 13c | 5c | 1.02 | 3,320 | 172 | 155 | 3.51 |
| 14c | 6c | 0.97 | 3,460 | >300 | 154 | 3.52 |
| 15c | 7c | 1.04 | 3,230 | 264 | 155 | — |
| 16c | 8c | 1.04 | 3,150 | 182 | 156 | 3.44 |

While the present invention has been described and illustrated by reference to particular embodiments thereof, it will be appreciated by those of ordinary skill in the art that the same lends itself to experimental determination of the limits of the invention which are established solely by the appended claims.

What is claimed is:

1. A process for improving the viscosity index (VI) of a base oil, comprising the steps of:

sequentially polymerizing styrene, isoprene, and a polyalkenyl coupling agent to form a star polymer having the formula $(A-B)_n-X$ wherein B is a hydrogenated block of polyisoprene having a number average molecular weight ($MW_1$) between 30,000 and 60,000, A is a block of polystyrene having a number average molecular weight ($MW_S$) from 3,000 to 4,000, X is a nucleus of the polymerized polyalkenyl coupling agent, and n is the number of block copolymer arms in the star polymer when coupled with 2.5 or more moles of the polyalkenyl coupling agent per mole of living block copolymer molecules;

recovering the star polymers as a solid crumb; and blending a VI improving amount of the star polymer crumb with a base oil.

2. The process of claim 1, wherein the molecular weight of the polyisoprene block is 53,400.

3. The process of claim 2, wherein the molecular weight of the polyisoprene block is 3,100.

4. The process of claim 1, wherein n is the number of arms when coupled with 3 moles of divinylbenzene per mole of living block copolymer molecules.

5. The process of claim 1, wherein the combination of the base oil and the star polymer is a 10w-40 multigrade lubricating oil composition.

6. The process of claim 1 wherein the polyisoprene blocks are at least 98% hydrogenated.

* * * * *